United States Patent
Kong (10) Patent No.: US 7,545,362 B2
(45) Date of Patent: Jun. 9, 2009

(54) MULTI-MODAL NAVIGATION IN A GRAPHICAL USER INTERFACE COMPUTING SYSTEM

(75) Inventor: Yuan Kong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 542 days.

(21) Appl. No.: 10/786,041

(22) Filed: Feb. 26, 2004

(65) Prior Publication Data

US 2005/0190144 A1    Sep. 1, 2005

(51) Int. Cl.
G09G 5/08 (2006.01)
G09G 5/00 (2006.01)

(52) U.S. Cl. .................. 345/158; 345/169
(58) Field of Classification Search ........... 345/157, 345/163–167, 173, 158, 169
See application file for complete search history.

(56) References Cited

U.S. PATENT DOCUMENTS

| | | | |
|---|---|---|---|
| 4,698,626 A | | 10/1987 | Sato et al. |
| 5,446,481 A | * | 8/1995 | Gillick et al. ............ 345/163 |
| 5,554,980 A | * | 9/1996 | Hashimoto et al. ........ 345/158 |
| 5,600,776 A | | 2/1997 | Johnson et al. |
| 5,689,703 A | | 11/1997 | Atkinson et al. |
| 5,771,038 A | * | 6/1998 | Wang .................. 345/163 |
| 5,945,981 A | | 8/1999 | Paull et al. |
| 6,130,664 A | * | 10/2000 | Suzuki .................. 345/158 |
| 6,181,325 B1 | | 1/2001 | Lee |
| 6,417,840 B1 | * | 7/2002 | Daniels ................ 345/158 |
| 6,460,058 B2 | | 10/2002 | Koppolu et al. |
| 6,480,184 B1 | * | 11/2002 | Price .................. 345/163 |
| 6,489,948 B1 | * | 12/2002 | Lau ................... 345/163 |
| 6,762,749 B1 | * | 7/2004 | Gouzman et al. ........ 345/163 |
| 6,784,870 B2 | * | 8/2004 | Yin .................... 345/156 |
| 6,842,169 B2 | * | 1/2005 | Griffin et al. ............ 345/163 |
| 7,239,305 B1 | * | 7/2007 | Nakano et al. .......... 345/173 |
| 2003/0132912 A1 | | 7/2003 | Hamana et al. |

FOREIGN PATENT DOCUMENTS

JP    07287639    10/1995

OTHER PUBLICATIONS

Yves Guiard et al., "Navigatoin as Multiscale Pointing: Extending Fitts' Model to Very High Precision Tasks", CHI '99, May 1999, pp. 450-457.
Ravin Balakrishnan et al., "The Rockin'Mouse: Integral 3D Manipulation on a Plane", CHI 97, Mar. 1997, pp. 311-318.
Ravin Balakrishnan et al., "The PadMouse: Facilitating Selection and Spatial Positioning for the Non-Dominant Hand", CHI 98, Apr. 1998, pp. 9-16.

(Continued)

Primary Examiner—Kevin M Nguyen
(74) Attorney, Agent, or Firm—Merchant & Gould P.C.

(57) ABSTRACT

A pointing device, and the use thereof, is described that allows a displayed cursor or other navigation control to be controlled in different modes, such as at different resolutions. The pointing device may include a first pointing element and a second pointing element. The first and second pointing elements may independently control the same navigation control using their own respective navigation modes. The pointing device may additionally or alternatively have switching capability to switch between navigation modes. In this way, a single pointing element may be used to control the navigation control in accordance with various navigation modes.

16 Claims, 10 Drawing Sheets

OTHER PUBLICATIONS

Simeon Keates, et al., "Cursor Measures for Motion-Impaired Computer Users", Assets 2002, Jul. 2002, pp. 135-142.

"Interaction Design for Large Displays", Swamlnathan & Sato design, Interactions, Jan.+Feb. 1997, pp. 15-24.

Brad Johanson, et al., "PointRight: Experience with Flexible Input Redirection in Interactive Workspaces", letters CHI, vol. 4, Issue 2, 2002, pp. 227-234.

Ken Hinckley et al., "Touch-Sensing Input Devices", CHI 99, May 1999, pp. 223-230.

European Search Report for application No. 05101079.1-1527, dated Oct. 12, 2006 (4 pages).

* cited by examiner

MULTI-MODAL NAVIGATION IN A GRAPHICAL USER INTERFACE COMPUTING SYSTEM

FIELD OF THE INVENTION

The present invention is directed to controlling movement of an on-screen cursor, and more particularly to controlling such movement in accordance with different modes of movement.

BACKGROUND OF THE INVENTION

As computer displays become cheaper to manufacture, user are more apt to choose higher resolution displays. In fact, due to the low cost of displays, many users have begun to link two or more displays together to provide a larger total display area with a greater number of pixels. However, users have also discovered that, as the total display area becomes larger, it becomes more difficult to control the on-screen cursor of a graphical user interface. There are essentially two types of cursor movement needed to fully control the cursor. First, a user needs to control the cursor with sufficient precision. That is, the user should expect to be able to control the cursor at high resolution, such as on a pixel-by-pixel basis. Such high resolution requirements are already needed for many software applications today, and one can expect even higher resolution requirements for new and future applications. This is especially important when using drawing or handwritten digital ink applications. Second, the user should be able to conveniently move the cursor from one end of the display area to the other. For example, it is ineffective and tiring for the user to make repetitive mouse movements simply to move the cursor and navigate across the display.

Unfortunately, these two needs are not compatible with each other using conventional cursor control systems. If the mouse is configured to move the cursor with high precision, then the cursor will not move very far for any given mouse movement. Likewise, if the mouse is configured to move the cursor over long distances efficiently, then the cursor will not be precisely controllable over smaller distances.

SUMMARY OF THE INVENTION

Aspects of the present invention are directed to providing a pointing device that allows a displayed cursor or other displayed navigation control to be controlled in different modes, such as at different resolutions. The pointing device may include one or more sub-devices such as one or more pointing elements. For example, first and second pointing elements of the same pointing device may independently control the same navigation control using their own respective navigation modes. The pointing device may additionally or alternatively have switching capability to switch between navigation modes. In this way, a single pointing element may be used to control the navigation control in accordance with various navigation modes. In either case, the pointing device may be part of a larger device such as a keyboard or computer, or the pointing device may be physically separate from other devices, such as physically separate from any keyboard.

Further aspects of the present invention are directed to allowing a user to use smaller muscle groups (e.g., fingers) to control the navigation control in a first navigation mode (e.g., at a higher resolution) and larger muscle groups (e.g., arms) to control the same navigation control in a second navigation mode (e.g., at a lower resolution).

Still further aspects of the present invention are directed to using multiple navigation engines, each implementing a different one of the navigation modes. Alternatively or additionally, a given navigation engine may have several sub-engines that each implement a different one of the navigation modes.

Still further aspects of the present invention are directed to providing a kit including both the pointing device and software that may include one or more of the above-discussed navigation engines.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

General Computing Platforms

Figure 1:
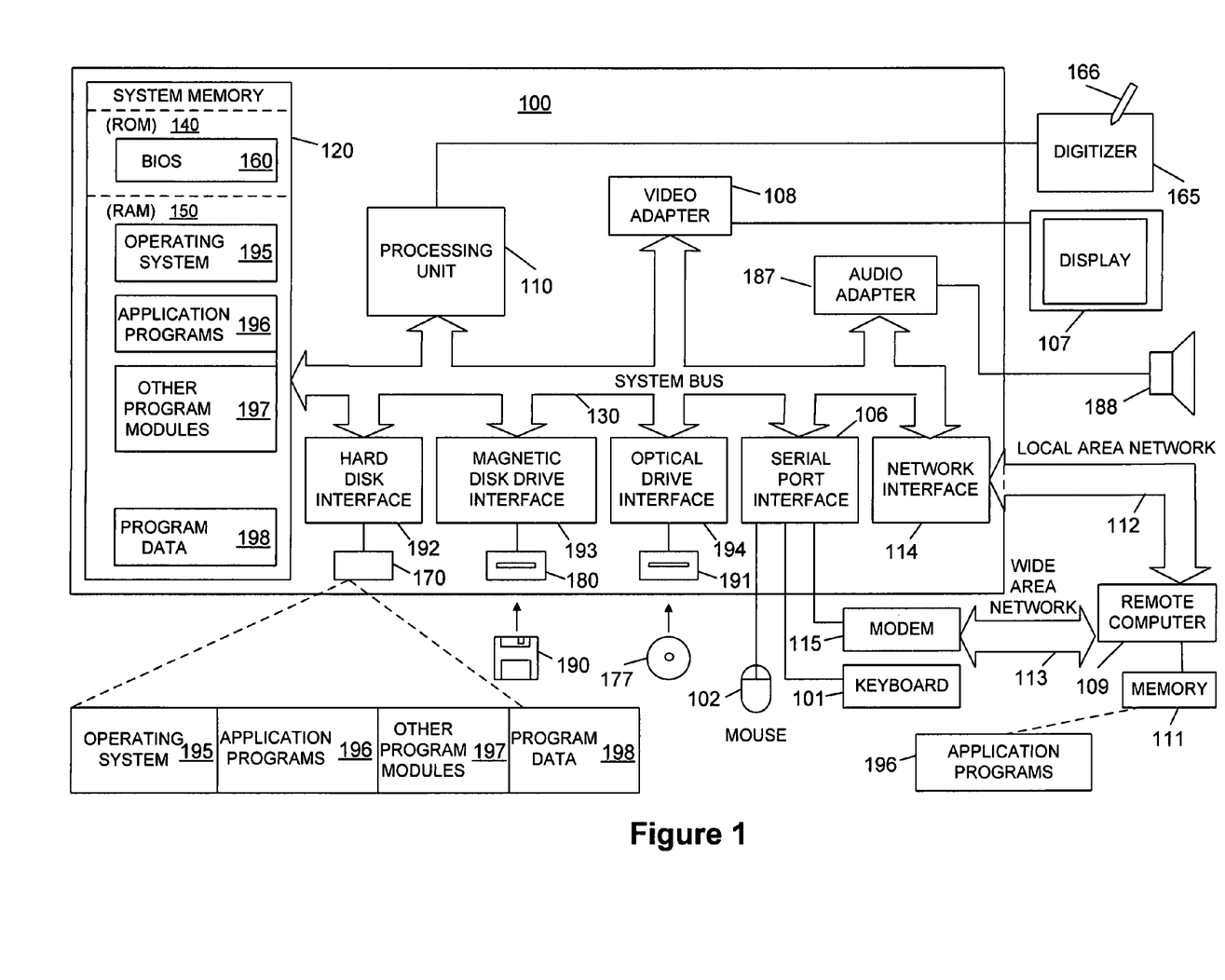
FIG. 1 is a functional block diagram of an illustrative digital computing environment in accordance with aspects of the present invention.

FIG. 1 is a functional block diagram of an example of a conventional general-purpose digital computing environment that can be configured and used to implement various aspects of the present invention. In FIG. 1, an illustrative computer 100 includes a processing unit 110, a system memory 120, and a system bus 130 that couples various system components including the system memory to the processing unit 110. The computer 100 may be any type of computer, such as, but not limited to, a mainframe, a server, a personal computer, a laptop computer, or a palmtop computer.

Describing the details of the structure of the computer 100 in FIG. 1, the system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the computer 100.

It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment. The term "computer-readable medium," as used herein, is intended to include a single medium as well as a collection of physically separate media, such as, for example, a collection of CD ROMs, or a CD ROM in combination with a computer memory.

A number of program modules may be stored on the hard disk drive 170, magnetic disk 190, optical disk 192, ROM 140, and/or RAM 150, including an operating system 195, one or more application programs 196, other program modules 197, and/or program data 198. A user can enter commands and information into the computer 100 through input devices such as a keyboard 101 and pointing device 102. The keyboard 101 may have a plurality of buttons and/or other user input devices. The plurality of buttons may include a numeric section and an alphanumeric section. Other input devices may include a microphone, joystick, game pad, satellite dish, scanner, stylus, or the like. These and other input devices may be coupled to the processing unit 110 through a serial port interface 106 that is coupled to the system bus, or they may be coupled by other interfaces such as a parallel port, a game port, or a universal serial bus (USB). Further still, these devices may be coupled directly to the system bus 130 via an appropriate interface (not shown).

A monitor or other type of display 107 may also be connected to the system bus 130 via an interface, such as a video adapter 108. In addition to the monitor, personal computers typically include other peripheral output devices (not shown), such as speakers and printers. In a preferred embodiment, a stylus digitizer 165 and accompanying stylus 166 are provided in order to digitally capture freehand input. Although a direct connection between the stylus digitizer 165 and the serial port is shown, in practice, the stylus digitizer 165 may be coupled to the processing unit 110 directly, via a parallel port or other interface and the system bus 130 as known in the art. Furthermore, although the digitizer 165 is shown apart from the display 107, it is preferred that the usable input area of the digitizer 165 be co-extensive with the display area of the display 107. Further still, the digitizer 165 may be integrated in the display 107, or may exist as a separate device overlaying or otherwise appended to the display 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the computer 100, or portions thereof, may be stored in the remote memory storage device.

It will be appreciated that the network connections shown are illustrative, and other techniques for establishing a communications link between the computers may be used. The existence of any of various well-known protocols such as TCP/IP, Ethernet, FTP, HTTP, and the like is presumed, and the system may be operated in a client-server configuration to permit a user to retrieve Internet web pages from a web-based server. Any of various conventional web browsers may be used to display and manipulate data on web pages.

The Cursor

Figure 2:
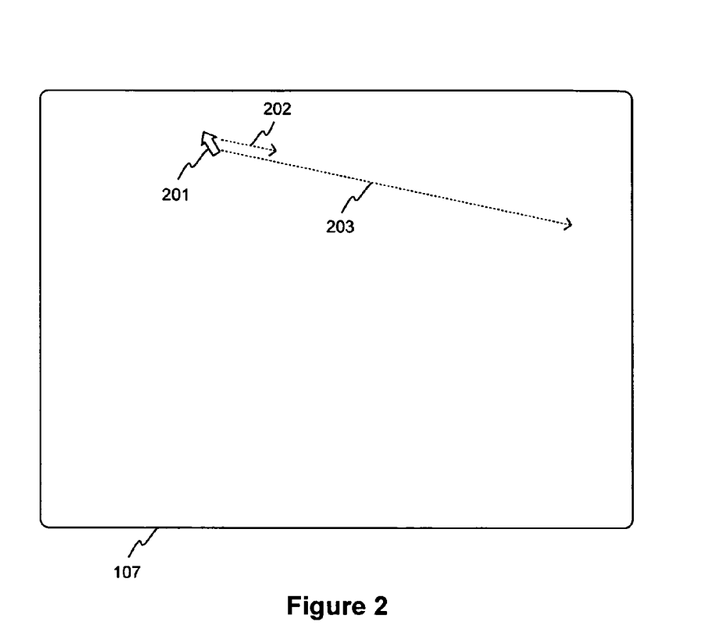
FIGS. 2 and 3 are illustrative computer displays showing a cursor-type navigation element displayed thereon.

Referring to FIG. 2, the computer 100 may display a cursor 201 on the display 107. The cursor 201 may move in two dimensions within the area of the display 107. Typically, some type of pointing device is used to control the movement of the cursor 201. For example, the mouse 102 and/or stylus 166 may be used. As indicated by the broken line arrows, the cursor 201 may be moved a shorter distance 202 or a longer distance 203, depending upon how the user controls the pointing device. Although the broken line arrows 202, 203 indicate a particular direction in which the cursor 201 moves, the cursor 201 may move in any direction on the display 107.

Figure 3:
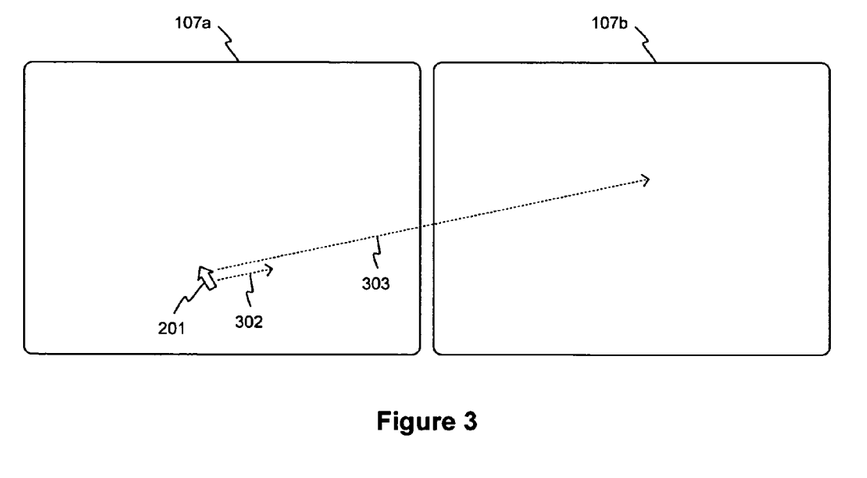

Referring to FIG. 3, the display 107 may be made up of a single physical display device or a plurality of individual display devices, such as display devices 107a and 107b. Often, such plural display devices are situated adjacent to one another so as to effectively increase the total amount of display area available. As shown in FIG. 3, the cursor 201 may stay within a single one of the plural display devices 107a, 107b, or the cursor 201 may move across the plural display devices 107a, 107b as though they were one continuous display. Which display the cursor 201 is in may depend upon how much and where the cursor 201 is moved. For example, the cursor 201 may be moved rightward only a small amount (indicated by broken line arrow 302) and remain within display 107a. Or, if the cursor 201 moves rightward sufficiently such that the cursor 201 reaches the right edge of the display device 107a, the cursor 201 may be commanded continue to move rightward (indicated by broken line arrow 303) from the left edge of the display device 107b.

Other Types of Navigation Controls

The traditional displayed cursor 201 is just one of many possible types of displayed navigation control. Other techniques for navigating in a computer system may be used. For example, information on a computer may be organized in a virtual sphere, and rotation of the virtual sphere as displayed on the display 107 may control which portions of the information may be accessed. In this case, being able to manipulate the virtual sphere (which would be a displayed navigation control) in different navigation modes (e.g., rotating the sphere at different speeds or resolutions depending upon the navigation mode) would be useful to allow the user to efficiently and precisely find to the desired portion of the information. Also, navigation through a virtual-reality interface may be made more efficient if different navigation modes may be accessed as described herein while navigating through such an interface. For example, in a virtual-reality interface, the user may navigate in three virtual dimensions, and the movement through those dimension may be controlled by the pointing device in accordance with a particular navigation mode. Many of the inventive aspects herein will be discussed illustratively with regard to controlling the cursor 201. However, these aspects may also be applied to other types of navigation controls.

Illustrative Multi-Modal Pointing Devices

Figure 4:
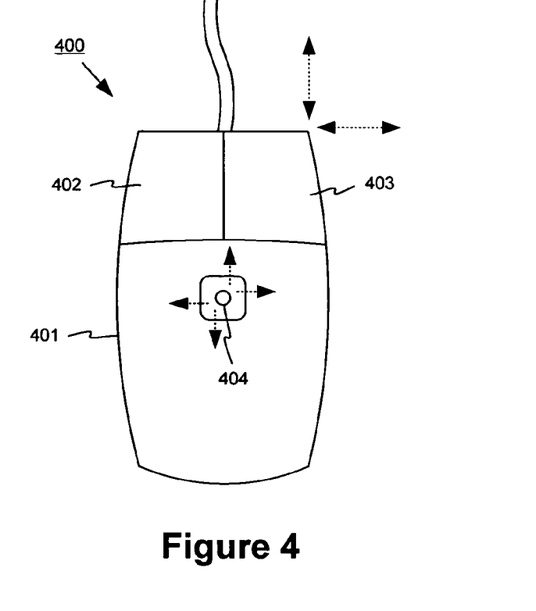
FIGS. 4-12 are various views of illustrative pointing devices having first and second pointing elements and/or switches for switching between navigation modes.

Referring to FIG. 4, a pointing device 400 may be provided that communicates with the computer 100 by requesting the computer 100 to move the cursor 201 (e.g., by sending the computer 100 data). As will be described below, one or more navigation engines running on the computer 100 may receive the data from the pointing device and move the cursor 201 in accordance with the data. To communicate the data, the pointing device 400 may be wirelessly coupled to the computer 100 or coupled via a wire. As is the case with many pointing devices, the pointing device 400 may not be integrated with a keyboard having an alphanumeric portion, such as the keyboard 101. Alternatively, the pointing device 400 may be integrated with a keyboard in a manner similar to how conventional pointing devices are combined with keyboards on conventional laptop computers. The illustrative pointing device 400 includes a body 401 such as a housing. The body 401 may be coupled to or include one or more buttons 402, 403. For example, the button 402 may be a conventional Left click button and the button 403 may be a conventional Right click button, as recognized by, e.g., WINDOWS brand operating systems and other operating systems. Thus, in such an operating system, the button 402 may be used to, e.g., select objects on the display 107, and the button 403 may be used to, e.g., summon context-dependent menus.

The body 401 of the pointing device 400 may be translated by a user with two degrees of freedom (in this example), as indicated by the four larger broken-line arrows in the upper right corner of FIG. 4. Translation of an object is a type of movement in which the object is displaced as a whole, as opposed to mere rotation of the object about its central axis. For example, where the pointing device 400 is in a form similar to a conventional mouse, the pointing device 400 may be translated across a surface (e.g., a flat surface). In such an embodiment, the body 401 itself may be considered a primary pointing element, such that moving the primary pointing element causes translation of the cursor 201. Where the body 401 rests on a surface (such as would a conventional mouse), a sensor of the primary pointing element detects the change in position of the body 401 along the surface. The sensor may be any type of sensor, such as a conventional trackball-type sensor or a conventional optical sensor, as are known in the art. The displayed cursor 201 may translate across the display 107 in accordance with user inputs to the primary pointing element, such as movements of the body 401. More generally, the navigation control (e.g., the cursor 201) may be moved on the display 107, or otherwise manipulated, in accordance with user inputs to the primary pointing element. Movement of the navigation control may include translation and/or rotation such as yaw, pitch, and/or roll.

The pointing device 400 may further include a secondary pointing element coupled to the body 401. The secondary pointing element may also control translation of the displayed cursor 201, or more generally, movement of the navigation control. Thus, the single pointing device 400 may include two different pointing elements integrated into the same device. The secondary pointing element may be in any of various forms. For example, the secondary pointing element may be a joystick 404. In this case, the joystick 404 may be moveable and/or tilt-able in various directions in two dimensions to control the movement of the cursor 201. For instance, where the user moves the joystick 404 in a direction such as toward the top of FIG. 4, then the cursor 201 may translate in a direction toward the top of the display 107. Or, where the user moves the joystick 404 in a direction toward the left side of FIG. 4, then the cursor 201 may translate in a direction toward the left of the display 107. In general, the secondary pointing element may detect the user's movements in a plurality of degrees of freedom and command the displayed cursor 201 to translate in accordance with the user's movements. The secondary pointing element (and thus the cursor 201) may be controlled with two, three, four, or more degrees of freedom. For example, two degrees of freedom may include forward/back and left/right. Three degrees of freedom may include, e.g., forward/back, left/right, and up/down. Four degrees of freedom may include, e.g., forward/back, left/right, up/down, and rotation about the up/down axis (or another axis).

Figure 8:
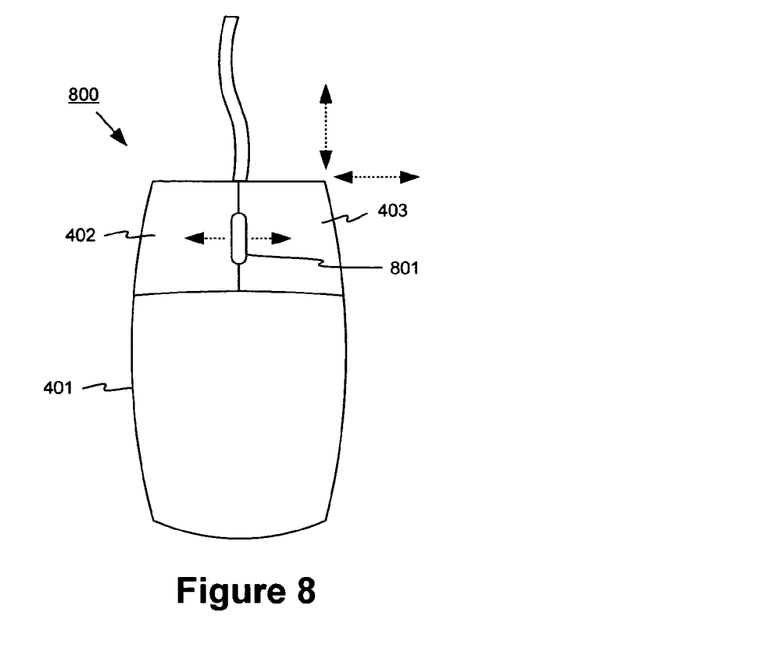

Other examples of a secondary pointing element include, but are not limited to, a touch-sensitive surface 501 (FIG. 5), a trackball 601 (FIG. 6), or a tiltable scroll wheel (FIG. 8). The touch-sensitive surface 501 senses movement of an object such as the user's finger across the touch-sensitive surface 501, and in response the pointing device 400 commands the displayed cursor 201 to translate in the display 107. Similarly, in response to the user moving the trackball 601, the pointing device 400 commands the displayed cursor 201 to translate in the display 107. Where the secondary pointing element is the tiltable scroll wheel 801, such tiltable scroll wheels are known in the art, and are implemented in such products as the Microsoft brand Wireless Optical Mouse 2.0 mouse. Such tiltable scroll wheels may rotate forward and backward around a first axis and tilt about a second axis (which is typically perpendicular to the first axis). Conventionally, manipulating a tiltable scroll wheel causes a document to scroll or pan, but does not cause the cursor to translate. The cursor 201 may thereby be controlled to translate up and down, for example, by rotating the scroll wheel 801 backward and forward. The cursor 201 may further be controlled to translate left and right, for example, by tilting the scroll wheel 801 left and right. For any of these types of secondary pointing elements, the direction, speed, and/or distance that the cursor 201 translates in the display 107 depends upon the input that the user applies to the secondary pointing element.

Figure 5:
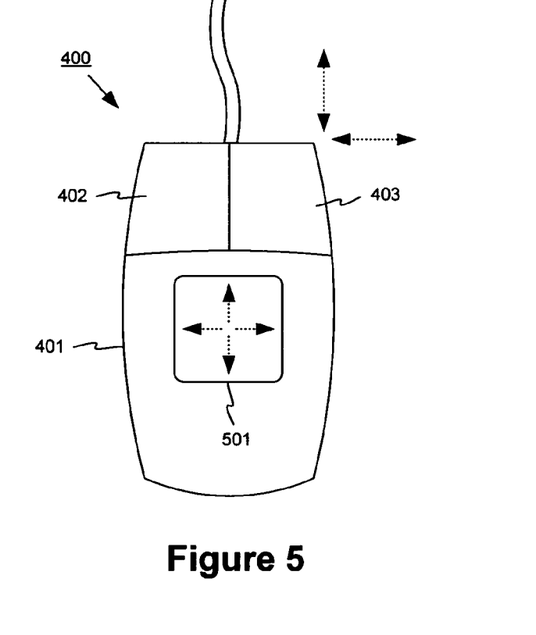
Figure 6:
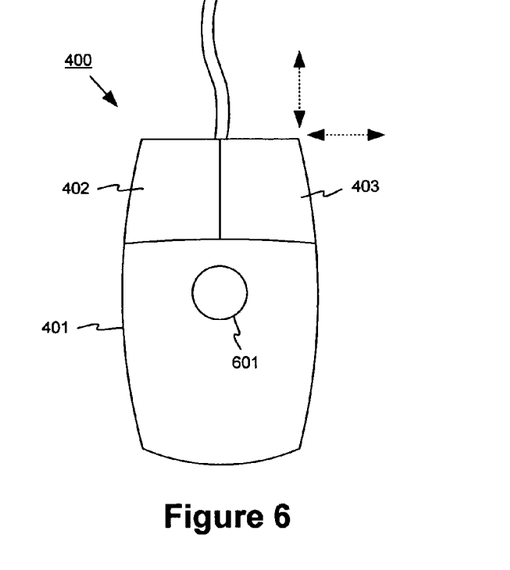

The secondary pointing element may be located anywhere with respect to the body 401, such as on a top portion of the body 401 facing the expected direction of the user, or on the front, the back, or a side of the body 401, such as is shown in FIGS. 4-6. In general, it may be desirable to place the secondary pointing element so as to be easily accessible by the user while the user is handling the pointing device 400.

It is noteworthy that in FIGS. 4-6, for example, the user may control the primary pointing element with one set of muscles and the secondary pointing element with a second set of muscles. For instance, in FIG. 4, the user may control the primary pointing element (in this case, movement of the body 401) using the user's arm and/or hand. Control of the secondary pointing element (in this case, movement of the joystick 404) may be performed with the user's fingers. Thus, in this example, a larger muscle group (in this case, the arm) controls one pointing element, and a smaller muscle group (in this case, the fingers) controls the other pointing element, on the same pointing device. This configuration can be especially useful where the primary pointing device is used to control the translation of the cursor 201 over larger distances (with a lower resolution of movement) and the secondary pointing device is used to control the translation of the cursor 201 over smaller, more precise distances (with a higher resolution of movement). Typically, a person's smaller muscle groups, such as fingers, may be more accurately controlled than a person's larger muscle groups, such as arms. Other muscle groups that may be used to control the translation of the cursor 201 include the user's wrists, torso, legs, feet, eyes, and head.

When using various muscle groups to control cursor movement, appropriate sensors may be implemented in the primary and/or secondary pointing elements. For example, where the position of the user's eyes is used as input to a pointing element, the pointing element may include a sensor that measures the position of the user's eyes. Such sensors are well-known. Or, where the position of the user's body in a room is used as input to a pointing element, the pointing element may include, for example, a camera with a fisheye lens to determine the user's position.

Figure 7:
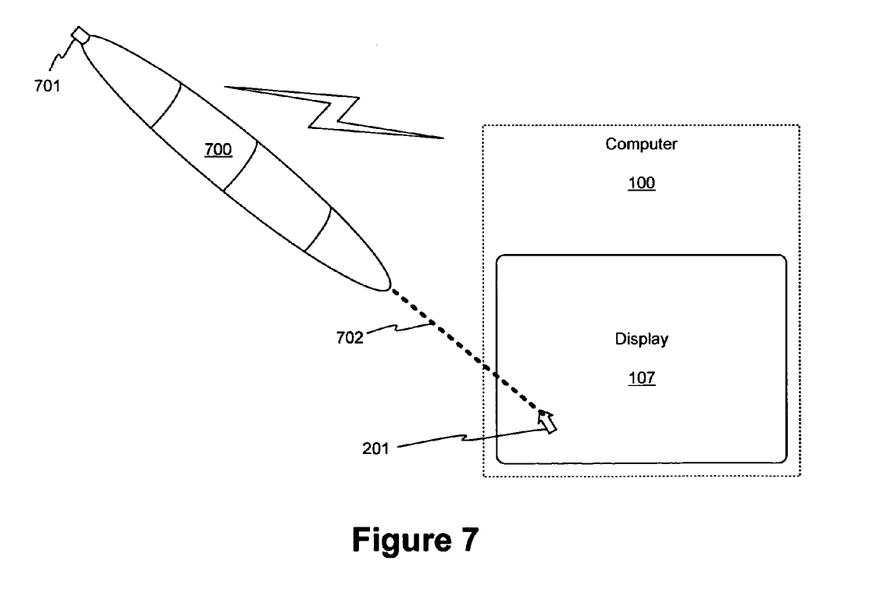

Although the pointing device 400 has been illustrated in FIGS. 4-6 to generally have a similar overall appearance as a conventional mouse, a pointing device according to aspects of the invention may take any of a variety of forms. The pointing device may be in the form of a mouse, a stylus, a trackball, a joystick, a touch-sensitive surface, and/or any other type of pointing device. For example, FIG. 7 shows an illustrative pointing device 700 in the form of a stylus. The pointing device 700 may interact directly with the display 107, especially where the display 107 is a touch-sensitive or proximity-sensitive surface (e.g., a display integrated with a digitizer). In this case, the cursor 201 may translate to wherever on the display 107 the tip of the stylus-like pointing device 700 is pointing. This is known as absolute tracking, because the pointing device 700 is able to control the absolute (as opposed to relative) position of the cursor 201. The pointing device 700 may alternatively interact less directly with the display 107 such as by emitting a laser beam 702 from a tip of the pointing device 700. The location of the laser beam 702 incident on the display 107 (where the display 107 senses the location of the laser beam 702) indicates where the cursor 201 should translate to. Again, this is an example of absolute tracking. The stylus-like pointing device 700 may alternately interact with the display 107 in other ways, such as electromagnetically.

The pointing device 700 may further include a secondary pointing element 701, which may be in any form such as, but not limited to, a joystick, a trackball, or a touch-sensitive surface. In the illustrated embodiment, the secondary pointing element 701 is disposed at one end of the stylus 700, and is in the form of a joystick-like device such as the "eraser" type pointing device conventionally used on many laptop keyboards. The secondary pointing element 701 may allow the user to exercise control over the cursor 201 in two dimensions using relative tracking. The user may press against the secondary pointing element 701 in a particular direction, thereby causing the cursor 201 to translate in a corresponding direction on the screen. In relative tracking, the cursor 201 is directed to translate in a particular direction, as opposed to being directed to move to a particular absolute location on the display 107. Thus, in relative tracking, the position of the cursor 201 depends upon the previous position of the cursor 201 before being directed to translate, whereas in absolute pointing this is not necessarily the case. The pointing device 700 may communicate data in accordance with the secondary pointing element 701 to the computer 100 via wire or wirelessly (as shown). Another example of a pointing element that may conveniently be used for absolute tracking is the touch-sensitive surface 501. In this case, the pointing device 400 may provide for both relative tracking (e.g., in accordance with movement of the body 401) and absolute tracking (e.g., in accordance with an absolute position of the user's finger on the touch-sensitive surface 501) of the cursor 201.

Referring to FIG. 8, another pointing device 800 may be switchable between two or more navigation modes. In this case, a secondary pointing element may or may not also be included. As shown, the illustrative pointing device 800 includes a scroll wheel 801 that not only scrolls up and down, but also tilts left and right (as indicated by the left and right broken line arrows near the scroll wheel 801). By rotating the scroll wheel 801, the display 107 may be scrolled. Also, typically various functions such as left and right scrolling may be implemented by tilting conventional scroll wheels left and right. In the present illustrative embodiment, however, tilting the scroll wheel 801 left or right switches between navigation modes.

A navigation mode defines how control of the pointing device 800 affects translation of the cursor 201 on the display 107. Navigation modes may define various aspects of cursor 201 translation, such as, but not limited to, the speed, translation resolution, translation distance, and/or acceleration of the cursor 201. A navigation mode may define these cursor translation aspects for either one or both of X and Y directions of cursor translation. For example, a first navigation mode may define the cursor translation aspects to be identical in the X and Y directions, while a second navigation mode may cause the cursor 201 to translate twice as fast in the X direction as in the Y direction for a corresponding user input in those directions. This navigation mode may be useful to select where, for example, the user desires to use several displays arranged horizontally so that there is a much larger distance to traverse in the X direction than in the Y direction. In general, various navigation modes may define the same or different cursor translation aspects in a first direction as compared with a second direction. Also, some navigation modes may define a linear relationship between manipulation (e.g., movement) of the pointing device 800 while other movement modes may define the relationship to be non-linear. Although switching between two navigation modes is discussed with regard to the present examples, three or more navigation modes may be available, and the user may be able to switch among three or more navigation modes.

Thus, for example, responsive to the user tilting the scroll wheel 801 to the left, a first navigation mode may be selected, and responsive to the user tilting the scroll wheel 801 to the right, a second different navigation mode may be selected. In the present example, the first navigation mode may be of a higher resolution than the second navigation mode. This means that, for the same user input upon the pointing device 800, the cursor 201 would translate a shorter distance across the display 107 in the first navigation mode than in the second navigation mode. For instance, where the pointing device 800 rests on a surface, the user may move the pointing device 800 in a straight line pointing to the right and slightly toward the user. Such movement may be for a given distance on the surface and at a given speed and acceleration. In the first navigation mode, the cursor 201 may translate as indicated by the broken line arrow 202 in FIG. 2. However, in the second navigation mode, and in response to exactly the same hypothetical user input, the cursor 201 may translate a longer distance as indicated by the broken line arrow 203. Similarly, a given user input may cause the cursor 201 to move as indicated by the broken line arrow 302 in FIG. 3, while the same user input may cause the cursor 201 to move a greater distance as indicated by the broken line arrow 303.

Figure 9:
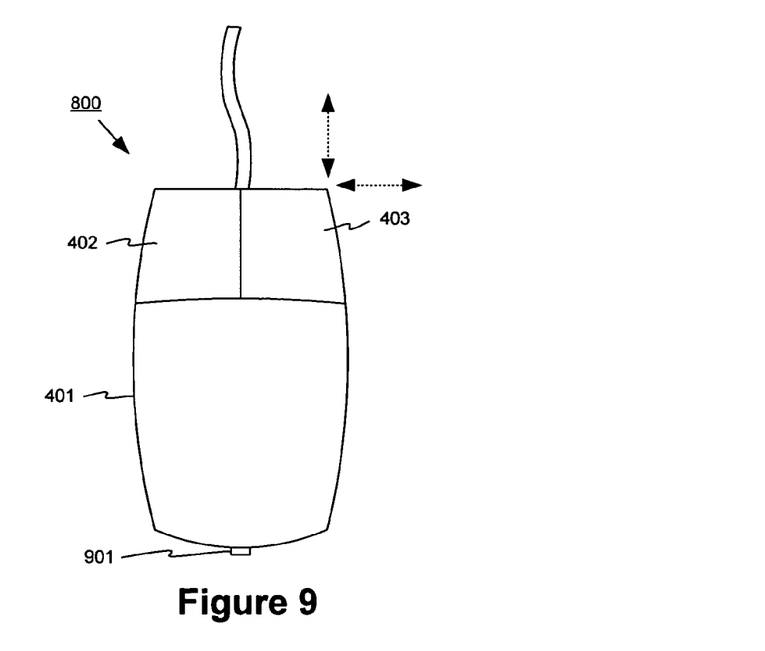

Variations of the pointing device 800 are envisioned. For example, the pointing device 800 may have a dedicated switch 901, as shown in FIG. 9. The switch 901 may be dedicated to switching between navigation modes, as opposed to the scroll wheel 801, which may be used not only for switching between navigation modes (e.g., left/right tilting), but also for scrolling (e.g., forward/back rotation). The switch 901 may be any type of user input element, such as, but not limited to, a push button, a two-position switch, a three- (or more) position switch, a sliding switch, a dial, a pressure-sensitive switch, a tilt-sensitive switch, or a touch-sensitive sensor. Also, the switch 901 may be disposed anywhere on the pointing device 800, although preferably in a location convenient (e.g., ergonomically practical) to the user while the user is handling the pointing device 800. For instance, the switch 901 may be on the rear of the pointing device 800 (as shown in FIG. 8), on the left or right sides, on the front, or on the top (such as is the scroll wheel 801). Alternatively, one or both of the buttons 402, 403 may be used to switch between navigation modes. As previously discussed for the pointing device 400, the pointing device 800 may be in any form and is not limited to a mouse-type pointing device as shown in FIGS. 8 and 9.

Figure 10:
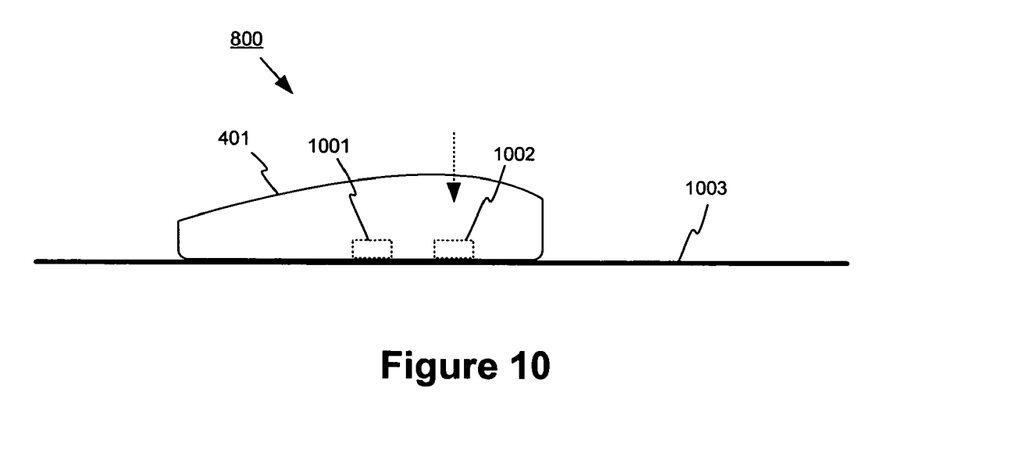

Referring to FIG. 10, the switch 901 may be embodied as a pressure-sensitive switch 1002. In the present example, the pointing device 800 may rest on a surface 1003, and the pressure-sensitive switch 1002 may detect whether the user is pressing the pointing device 800 down upon the surface 1003 with sufficient pressure (i.e., exceeding a predetermined pressure threshold). Depending upon whether the pointing device 800 is being pressed down sufficiently, either the first or the second navigation mode is applied to translation of the cursor 201. Thus, for example, when the user is translating the pointing device 800 across the surface 1003 but is not pressing down upon the pointing device 800 with sufficient pressure, then the cursor 201 translates across the display 107 in accordance with the first navigation mode. But, when the user is translating the pointing device 800 across the surface 1003 while pressing down upon the pointing device 800 with sufficient pressure, then the cursor 201 translates across the display 107 in accordance with the second navigation mode. Also shown in FIG. 10 is a sensor 1001 that senses movement of the pointing device 800 across the surface 1003. The sensor 1001 may be an optical sensor, a trackball sensor, or any other sensor. Such sensors are known in the art and used in, e.g., many conventional mice.

Figure 11:
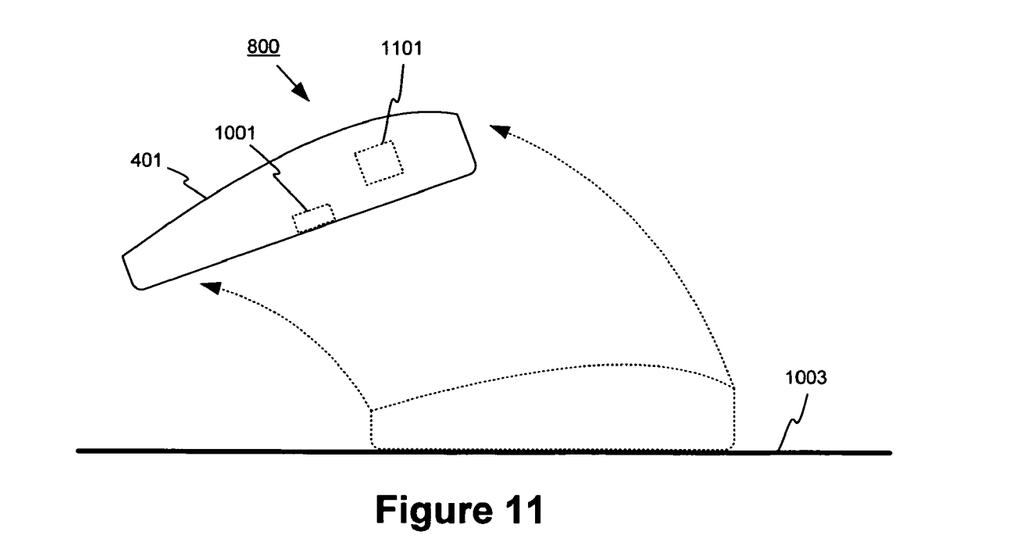

Referring to FIG. 11, the pointing device 800 may further be configured to be usable even while in mid-air. In this instance, the pointing device 800 may include a sensor 1101 that can sense mid-air movements (e.g., mid-air translations and/or other movements) of the pointing device 800. Such sensors, e.g., gyroscopic sensors, are well known. In this case, the sensor 1001 or another sensor may detect whether or not the pointing device 800 is resting on the surface 1003. Thus, for example, a different navigation mode may be applied depending upon whether the pointing device 800 is resting upon and moving across the surface 1003 or moving in mid-air.

Figure 12:
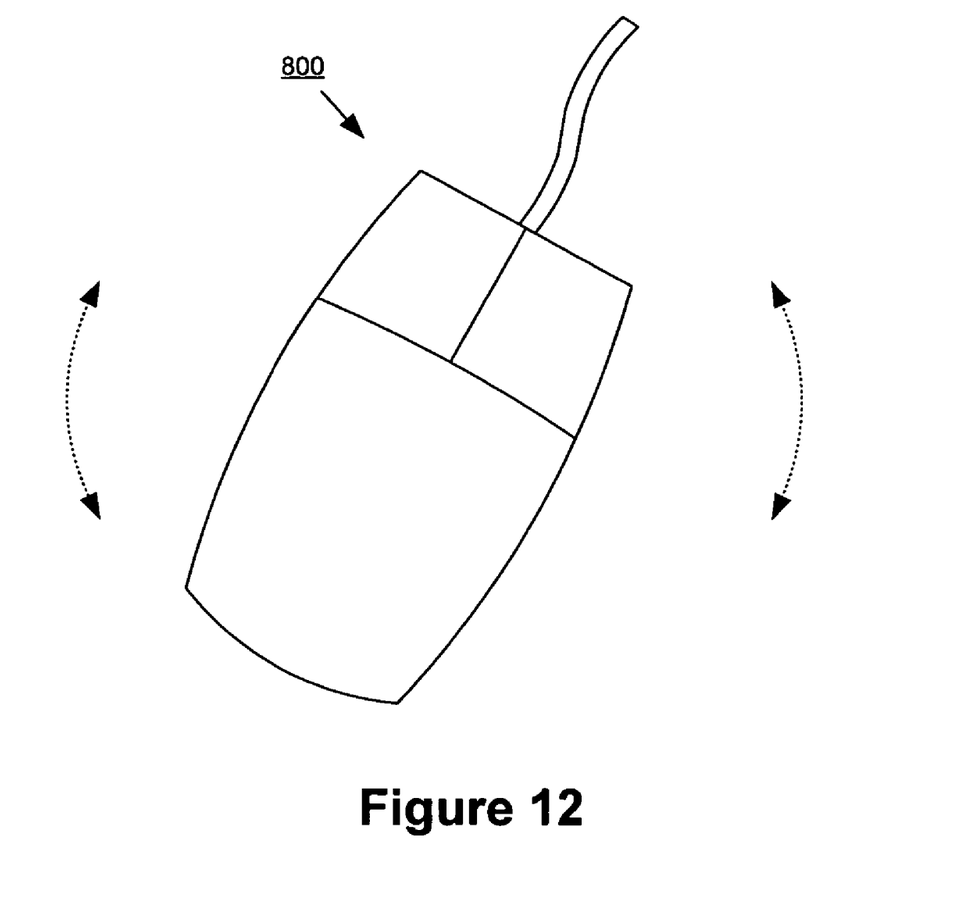

Referring to FIG. 12, the pointing device 800 may be rotation-sensitive (in addition to being translation-sensitive). In other words, the pointing device 800 may be configured to detect whether the user is rotating the pointing device 800 (as indicated by the broken line arrows) clockwise or counter-clockwise. Such rotation may be made upon the surface 1003 or in mid-air, and may be around any desired axis such as the axis normal to the surface 1003. The sensor 1001 or another sensor may be configured to sense the rotation, or even the orientation of the pointing device 800 relative to a reference orientation. Various techniques may be used to measure the orientation of the pointing device 800, such as known magnetic, acoustical, or optical techniques. For example, the pointing device 800 may have a built-in magnetic compass or a gyroscope for tracking the orientation of the pointing device 800. Depending upon the direction of rotation or the absolute angle, different navigation modes may be selected and applied. Thus, for example, when the pointing device 800 is angled toward the left while being moved across the surface 1003, then the first navigation mode is applied to the cursor 201. On the other hand, when the pointing device 800 is angled toward the right while being moved across the surface 1003, then the second navigation mode is applied. In this way, a plurality of navigation modes may be associated with different respective angles of the pointing device 800 (or different respective angle ranges).

The computer 100 and/or pointing device 800 may be configured to sense a gesture that involves movement of the pointing device 800 in the clockwise or counter-clockwise direction. Thus, a gesture such as a quick small counter-clockwise rotation, for example, may select the first navigation mode, while a quick clockwise rotation may select the second navigation mode. Subsequent movements of the pointing device 800 would cause the cursor 201 to translate in accordance with the last-selected navigation mode. In general, any gesture made with the pointing device may be used to select a navigation mode.

Figure 13:
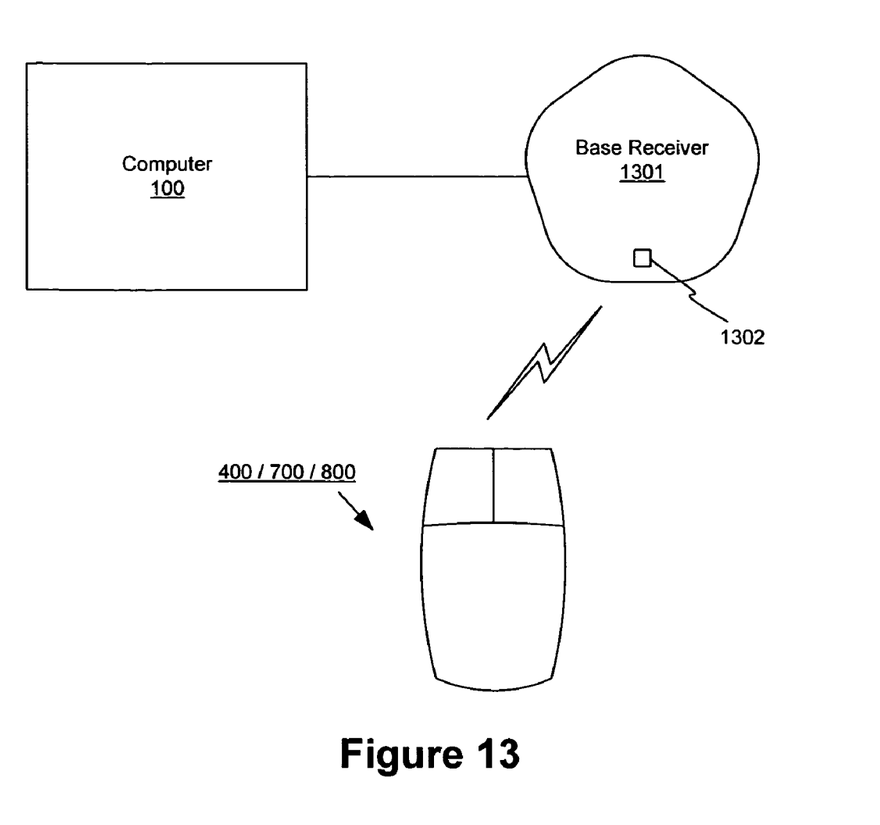
FIG. 13 is a plan view of an illustrative pointing device along with a wireless receiver with navigation mode switching capabilities.
Figure 14:
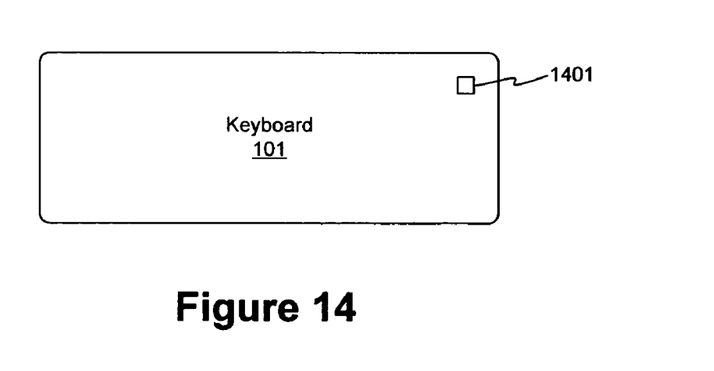
FIG. 14 is a plan view of an illustrative keyboard with navigation mode switching capabilities.

As previously mentioned, a pointing device may be coupled to the computer 100 via wire or wirelessly. As shown in FIG. 13, the pointing device 400 (or 700 or 800) may be coupled to the computer 100 wirelessly through a base receiver 1301. Such base receivers are well known, such as the Microsoft brand Wireless Optical Desktop Receiver 2.0A. As shown, the base receiver 1301 may have a switch 1302 that allows the user to switch between the navigation modes. Alternatively, as shown in FIG. 14, the keyboard 101 may have a switch 1401 that allows the user to switch between the navigation modes. Yet another location for a switch that functions like the switch 901 is on the computer 100 itself. The switches 1302 and 1401 may be any type of switch such as those described with regard to the switch 901, and may function in the same way as the switch 901.

Various examples of pointing devices and navigation modes have thus been described. However, aspects of the present invention are not limited to these examples. Pointing devices may have various combinations of first and second pointing elements. For example, some pointing elements that may preferably be used for lower resolution cursor control include, but are not limited to, an inertial sensor, a tilt sensor, a laser pointer or light gun and sensor, an optical sensor (such as a video camera), an acoustical sensor (such as an ultrasonic sensor), or an eye or face angle tracking sensor. These are pointing elements that may be controlled with larger muscle groups. Some pointing elements that may preferably be used for higher resolution cursor control include, but are not limited to, a trackball, a touchpad, a potentiometer, or a high-resolution wheel. These are pointing elements that may be controlled with smaller muscle groups. However, the present invention is not limited to using smaller or larger muscle groups, or to any particular types of pointing devices or pointing elements.

Multi-Modal Navigation Engine(s)

Figure 15:
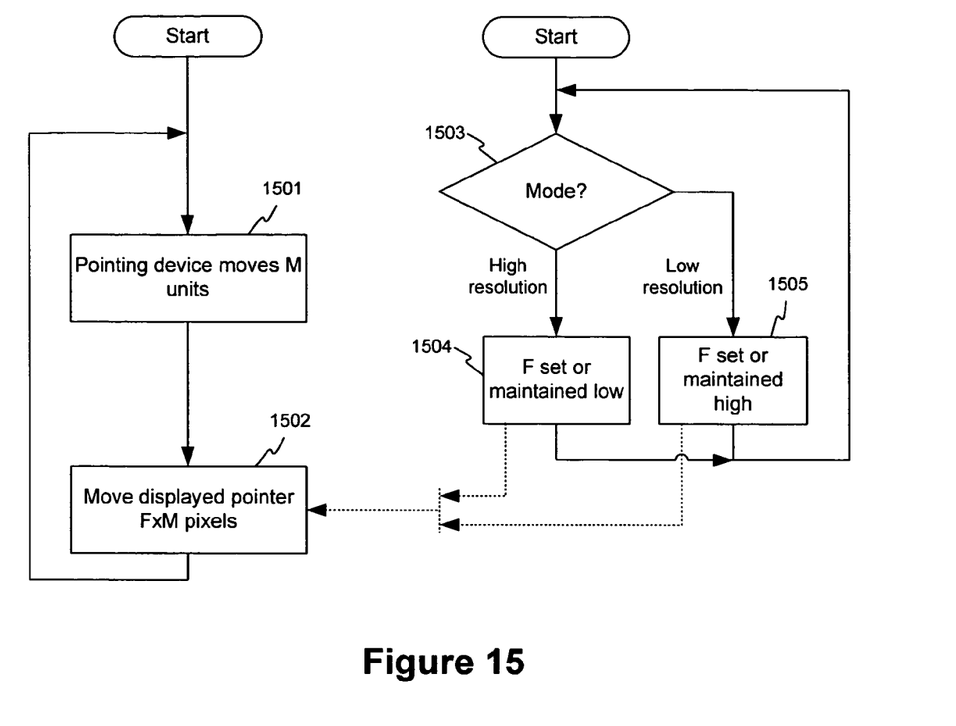
FIG. 15 is a flowchart showing an illustrative method for implementing multi-modal cursor control.

Referring to FIG. 15, the computer 100 may control the cursor 201 in a plurality of different navigation modes, such as a high resolution navigation mode and a low resolution navigation mode. As previously discussed, other types of navigation modes may be used. In the present example, it will be assumed for illustrative purposes that the pointing device 400 as shown in FIG. 8 will be used in conjunction with the flowchart of FIG. 15. However, other embodiments of a pointing device may be used.

Figure 16:
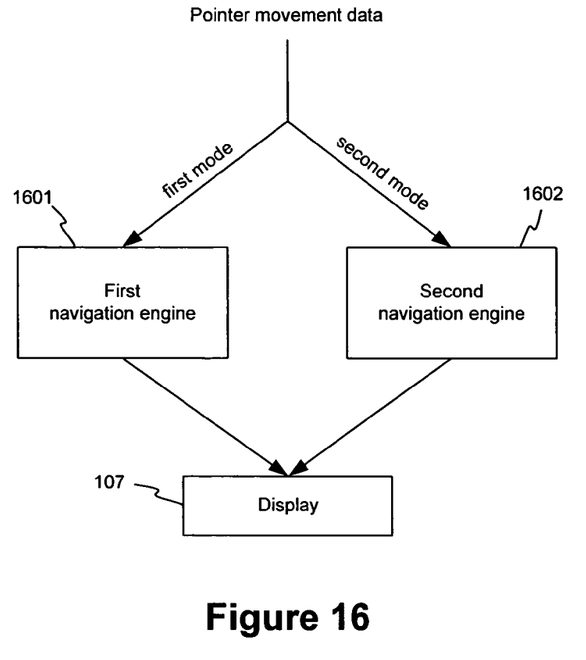
FIG. 16 is a functional block diagram of an illustrative set of navigation engines.
Figure 17:
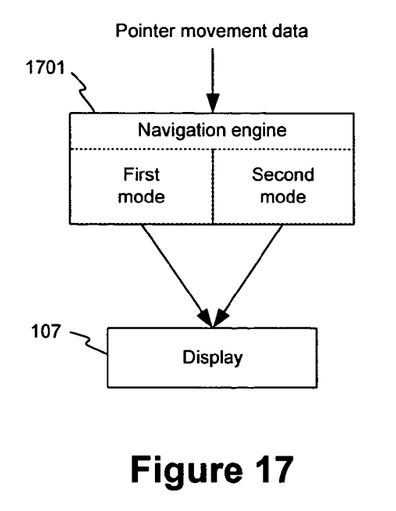
FIG. 17 is a functional block diagram of an illustrative navigation engine having sub-engines.

One or move navigation engines may reside in the computer 100. A navigation engine may be software, hardware, and/or firmware that receives information from the pointing device 400 and determines when and how to move the pointer 201 in response to the information. To implement the multiple navigation modes, multiple navigation engines may be used (such as is shown in FIG. 16), or a single navigation engine with multiple modes may be used (such as is shown in FIG. 17). Referring to FIG. 16, two or more separate navigation engines 1601 and 1602 may be configured to receive data from the pointing device (e.g., pointing device 400) indicating an amount of movement of the pointing device (or an amount of other user input to the pointing device). The data may be in accordance with the user's input upon a particular one or more of the pointing elements in the pointing device. Depending upon which navigation mode is applicable, a different one of the navigation engines 1601, 1602 determines how much to translate the cursor 201 and then actually translates the cursor 201. In FIG. 17, a single navigation engine 1701 may have multiple portions each configured to implement a different one of the navigation modes. The multiple portions may be separately coded or may share portions of code. Depending upon which navigation mode is applicable, a different one of the portions of the navigation engine 1701 may determine how much to translate the cursor 201 and then actually translate the cursor 201.

The navigation engine(s) of the computer 100 may operate as illustratively follows. In step 1501, the pointing device 400 may be moved across a surface (such as the surface 1003) a distance of M units (such as M millimeters) in a particular direction. The pointing device 400 may provide data to the computer 100 indicating the amount and direction of movement. In response, in step 1502, the computer 100 may determine an amount and direction that the displayed cursor 201 should translate on the display 107, and actually translate the cursor 201. This amount may be some linear or non-linear function of the amount and/or direction of movement of the pointing device 100, and may further be a function of the active navigation mode. For example, the cursor 201 may be translated F×M pixels, where F is a multiplier that is defined by the active navigation mode. F may be constant or variable for each navigation mode. In general, for a higher resolution navigation mode, F will be smaller, and for a lower resolution navigation mode, F will be larger. Therefore, in the high resolution navigation mode, F will be larger, and for a given movement M, the cursor 201 translation F×M will be shorter (such as the movement indicated by the broken line arrow 202 in FIG. 2). Likewise, in the low resolution navigation mode, F will be smaller, and for a given identical movement M, the cursor 201 translation F×M will be longer (such as the movement indicated by the broken line arrow 203 in FIG. 2).

The pointing device 400 may further provide navigation mode data to the computer 100 indicating which of the navigation modes should be applied to the translation of the cursor 201. Such navigation mode data may be send regularly or only when the navigation mode is to be changed or otherwise needs to be selected (such as at startup). Accordingly, in step 1503, the computer 100 may determine which navigation mode is currently applicable and set (or maintain) the multiplication factor F as dictated by that navigation mode. For example, if the high resolution navigation mode is active, then in step 1504 F is set or maintained at a lower value (or set of values). If the low resolution navigation mode is active, then in step 1505, F is set or maintained at a higher value (or set of values).

CONCLUSION

Thus, various ways of controlling a cursor on a computer display have been described. Using aspects of the invention, a user may, for example, be able to control a cursor over shorter distances with precision while still being able to move the cursor over a much larger distance when desired. The user may be able to control the same cursor in these different ways without needing to change pointing devices or navigate through layered configuration menus. In fact, the user may be able to exercise various levels of control over the cursor "on the fly," with relatively minimal interruption to the user's other computer activities.

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Also, the invention has been defined using the appended claims, however these claims are exemplary in that the invention is intended to include the elements and steps described herein in any combination or sub-combination. It will also be appreciated and understood that modifications may be made without departing from the true spirit and scope of the invention.

What is claimed is:

1. A pointing device configured to communicate with navigation software running on a computer having a display, the pointing device comprising:

a sensor configured to sense a physical input, the pointing device configured to request the navigation software to move a navigation control on the display in accordance with the physical input, the navigation control being a cursor; and a selector having a first state and a second state, the pointing device configured to request the navigation software to move the navigation control in accordance with a first navigation mode or a second navigation mode depending upon the state of the selector, wherein the pointing device is not integrated with a keyboard having an alphanumeric section, wherein the selector is an angular sensor configured to sense an angle of the pointing device, and wherein in the first navigation mode the navigation control moves at a first sensitivity in accordance with the physical input, and in the second navigation mode the navigation control moves at a second different sensitivity in accordance with the same physical input such that in the first navigation mode the navigation control moves by an amount that has a first relationship with the movement of the pointing device, and in the second navigation mode the navigation control moves by an amount that has a second different relationship with the movement of the pointing device, the navigation control moving linearly in accordance with the movement of the pointing device in both the first and second navigation modes.

2. A kit, comprising:
the pointing device of claim 1; and
a computer-readable medium storing computer-executable instructions representing the navigation software.

3. The kit of claim 2, wherein the navigation software includes a first navigation engine and a second navigation engine, the first navigation mode utilizing the first navigation engine and the second navigation mode utilizing the second navigation engine.

4. The pointing device of claim 1, further including a Left click button and a Right click button in addition to the selector.

5. The pointing device of claim 1, wherein the selector has different physical positions each representing a different one of the first and second states.

6. The pointing device of claim 1, wherein the selector is a scroll wheel rotatable around a first axis and tilt-able around a second axis, the first and second states being selected by a tilt of the scroll wheel.

7. An apparatus, comprising:
a sensor configured to sense a physical input, the apparatus configured to control two-dimensional movement of a displayed a navigation control in accordance with the physical input; and
a selector having a first state and a second state, the apparatus configured to control the two-dimensional movement of the displayed navigation control at either a first sensitivity in accordance with the physical input or a second sensitivity in accordance with the same physical input depending upon whether the selector is in a first state or a second state, wherein the selector is an angular sensor configured to sense an angle of the apparatus, wherein the first state is associated with a first angle of the apparatus and the second state is associated with a second angle of the apparatus, wherein, when the selector is in the first state, the navigation control moves by an amount that has a first relationship with the movement of the apparatus, and, when the selector is in the second state, the navigation control moves by an amount that has a second different relationship with the movement of the apparatus, the navigation control moving linearly in accordance with the movement of the apparatus when the selector is in both the first and second states.

8. The apparatus of claim 7, further including a Left click button and a Right Click button in addition to the selector.

9. The apparatus of claim 7, wherein the physical input is translation of the apparatus.

10. The apparatus of claim 7, wherein the displayed navigation control is a displayed cursor.

11. A pointing device configured to communicate with navigation software running on a computer having a display, the pointing device comprising:
a selector configured to switch between a first state and a second state responsive to a first physical input, wherein the selector is an angular sensor configured to sense an angle of the pointing device, and wherein the first state is associated with a first angle of the pointing device and the second state is associated with a second angle of the pointing device; and
a sensor coupled to the selector and configured to sense a second physical input, the pointing device configured to request the navigation software to translate a navigation control across the display at a first sensitivity in accordance with the second physical input while the selector is in the first state, and to request the navigation software to translate the navigation control across the display at a second sensitivity in accordance with the second physical input while the selector is in the second state, wherein, when the selector is in the first state, the navigation control moves by an amount that has a first relationship with the movement of the pointing device, and, when the selector is in the second state, the navigation control moves by an amount that has a second different relationship with the movement of the pointing device, the navigation control moving linearly in accordance with the movement of the pointing device when the selector is in both the first and second states.

12. The pointing device of claim 11, further including a Left click button and a Right click button in addition to the selector.

13. The pointing device of claim 11, wherein the selector has different physical positions each representing a different one of the first and second states.

14. The pointing device of claim 11, wherein the second physical input is translation of the apparatus.

15. The pointing device of claim 11, wherein the apparatus is configured to translate upon a surface, the selector being responsive to pressure applied to the apparatus against the surface, the selector configured to be in either the first state or the second state depending upon an amount of the pressure.

16. The pointing device of claim 11, wherein the displayed navigation control is a displayed cursor.

* * * * *